(12) United States Patent
Tamaki

(10) Patent No.: US 7,147,356 B2
(45) Date of Patent: Dec. 12, 2006

(54) RING-SHAPED LIGHT EMITTING UNIT

(75) Inventor: Makoto Tamaki, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 11/297,322

(22) Filed: Dec. 9, 2005

(65) Prior Publication Data
US 2006/0139946 A1 Jun. 29, 2006

(30) Foreign Application Priority Data
Dec. 24, 2004 (JP) .............................. P2004-373019

(51) Int. Cl.
G02B 6/00 (2006.01)
(52) U.S. Cl. ........................ 362/551; 362/511; 362/555; 385/146
(58) Field of Classification Search ................ 362/551, 362/555, 26, 511; 385/127, 901, 146, 32; 40/547
See application file for complete search history.

(56) References Cited
U.S. PATENT DOCUMENTS
6,874,924 B1 * 4/2005 Hulse et al. ................ 362/551

2002/0037134 A1 * 3/2002 Akamatsu et al. ............ 385/32

FOREIGN PATENT DOCUMENTS
JP 2003-297107 10/2003
JP 2003-297108 10/2003
JP 2004-14122 1/2004

* cited by examiner

Primary Examiner—Stephen F Husar
Assistant Examiner—Meghan K. Dunwiddie
(74) Attorney, Agent, or Firm—McGinn IP Law Group, PLLC

(57) ABSTRACT

A ring-shaped light emitting unit comprising a ring-shaped light guiding member having a light emitting surface which continues in a direction in which the ring-shaped light guiding unit extends, and a light guiding path for introducing light of a light source into the ring-shaped light guiding member which is continuously connected to part of an outer circumference of the ring-shaped light guiding member, wherein the outer circumference of the ring-shaped light guiding member excluding a light inlet portion is truly round. In addition, an inner circumference of the ring-shaped light guiding member is also truly round. A center of the inner circumference of the ring-shaped light guiding member is located closer to an open end of the light guiding path than a center of the outer circumference of the ring-shaped light guiding member.

19 Claims, 8 Drawing Sheets

RING-SHAPED LIGHT EMITTING UNIT

This application is based on Japanese Patent Application No. 2004-373019, which is incorporated herein by reference.

BACKGROUND OF THE INVENTION

1. Field of the Invention

The present invention relates to a ring-shaped light emitting unit. The invention is used to decorate speaker grilles or watches or speedometers or tachometers of vehicles (automobiles, trains) or aircraft.

2. Description of the Related Art

There is an increasing tendency to try to decorate various objects (for example, interior products of vehicles) with light based on the background that light sources such as LEDs which consume less power are now allowed to be used and that the adherence of consumers to design is increased. As part of the tendency, light emitting units are under development in which a ring-shaped light is obtained by utilizing a ring-shaped light guiding body and a light source in combination. One example of related ring-shaped light emitting units is shown in FIG. 7 (refer to JP-A-2004-14122). In the example shown in FIG. 7, a light guiding path 53, which introduces light of a light source 52, is formed in such a manner as to continue to an outer circumferential portion of a ring-shaped light guiding member 51, whereby the light of the light source 52 is introduced into the ring-shaped light guiding member 51 through the light guiding path 53 from a circumferential (lateral) direction. According to the light introducing method like this, the introduced light is allowed to travel along a direction in which the ring-shaped light guiding member 51 extends efficiently. However, part of the light is lost during the passage thereof through the ring-shaped light guiding member 51, whereby a portion of the light guiding member 51 in the vicinity of a light inlet portion tends to be illuminated brightly in any way, whereas the light guiding member 51 extends farther away from the vicinity of the light inlet portion, it tends to get darker. To cope with this problem, a method has been considered in which the insufficient luminance at an area farther away from the light inlet portion is compensated for by gradually changing the width of the ring-shaped light guiding member by changing the curvature of an outer circumference of the light guiding member. In this method, however, a convergence of light is caused due to the change in the curvature of the outer circumference, and as a result, there is caused a problem that an emission line is caused to appear.

On the other hand, as shown in FIG. 8, there have been proposed methods in which light is introduced from a lower surface 62 of a ring-shaped light guiding member 61 (refer to JP-A-2003-297107 and JP-A-2003-297108). In a method shown in FIG. 8A, light of a light source 52 is directly introduced into a ring-shaped light guiding member 61. Then, lights directed in two leftward and rightward directions are produced from the light so introduced by the action of a light deflecting means 63. In a method shown in FIG. 8B, a light guiding path 66 is provided perpendicularly on a lower surface 62 of a ring-shaped light guiding member 61. In this configuration, lights directed in two leftward and rightward directions are produced from light introduced into the ring-shaped light guiding member 61 via the light guiding path 66 by the action of a light deflecting means 63. Thus, in these configurations, light is designed to reach to everywhere in the entirety of the ring-shaped light guiding member 61 by making use of the light deflecting means 63. However, since the light deflecting means 63 is formed in the ring-shaped light guiding member 61, this causes a problem of badly affecting the light guiding effect, and as a result, the luminance of light emitted becomes uneven. In particular, there is caused a problem that a cut line is observed in the light guided.

SUMMARY OF THE INVENTION

The invention was made in view of the aforesaid problems, and an object thereof is to provide a light emitting unit which can produce a ring-shaped light with an even luminance. In addition, another object of the invention is to provide a light emitting unit which can emit light which not only provides an even luminance but also has a high luminance. Furthermore, a further object of the invention is to provide a light emitting unit which can produce a ring-shaped light which is free from an emission line (an area which is extremely bright compared with other portions).

With a view to attaining at least one of the objects, according to the invention, there is provided a ring-shaped light emitting unit comprising a ring-shaped light guiding member having a light emitting surface which continues in a direction in which the ring-shaped light guiding body extends, and a light guiding path for introducing light of a light source into the ring-shaped light guiding member connected to part of an outer circumference of the ring-shaped light guiding member, wherein the outer circumference, excluding a light inlet portion, of the ring-shaped light guiding member and an inner circumference thereof are truly round when viewed from the top, and a center of the inner circumference of the ring-shaped light guiding member is located closer to an open end of the light guiding path than a center of the outer circumference of the ring-shaped light guiding member. Incidentally, the ring-shaped light guiding path can be continuously connected to a part of the ring-shaped light guiding member.

In the above configuration, since the an outer circumferential configuration of the ring-shaped light guiding member is truly round except for the vicinity of the light inlet portion (the portion where the light guiding path is connected), the convergence of light (the generation of an emission line), which is attributed to the change in curvature of the outer circumferential surface, can be prevented. On the other hand, the inner circumference of the ring-shaped light guiding member is truly round with the center thereof located closer to the open end of the light guiding path than the center of the outer circumference of the ring-shaped light guiding member. Consequently, the area of the ring-shaped light guiding member is narrowed. Here, since the area resides farther away from the light inlet portion in the ring-shaped light guiding member, the total amount of light that reaches the area is smaller than that at the light inlet portion. Due to this, while there occurs a risk that the amount of light emitted at the area becomes insufficient, the light density thereat is increased because the area is narrowed, and hence the amount of light emitted is increased. Namely, according to the aforesaid configuration, the amount of light emitted can be increased at the area where the total amount of light reaching is insufficient, whereby the luminance of light emitted can be even over the entirety of the light guiding member. As a result, a ring-shaped light can be produced which has a highly even luminance.

DETAILED DESCRIPTION OF THE PREFERRED EMBODIMENTS (Ring-Shaped Light Guiding Member)

Figure 1:
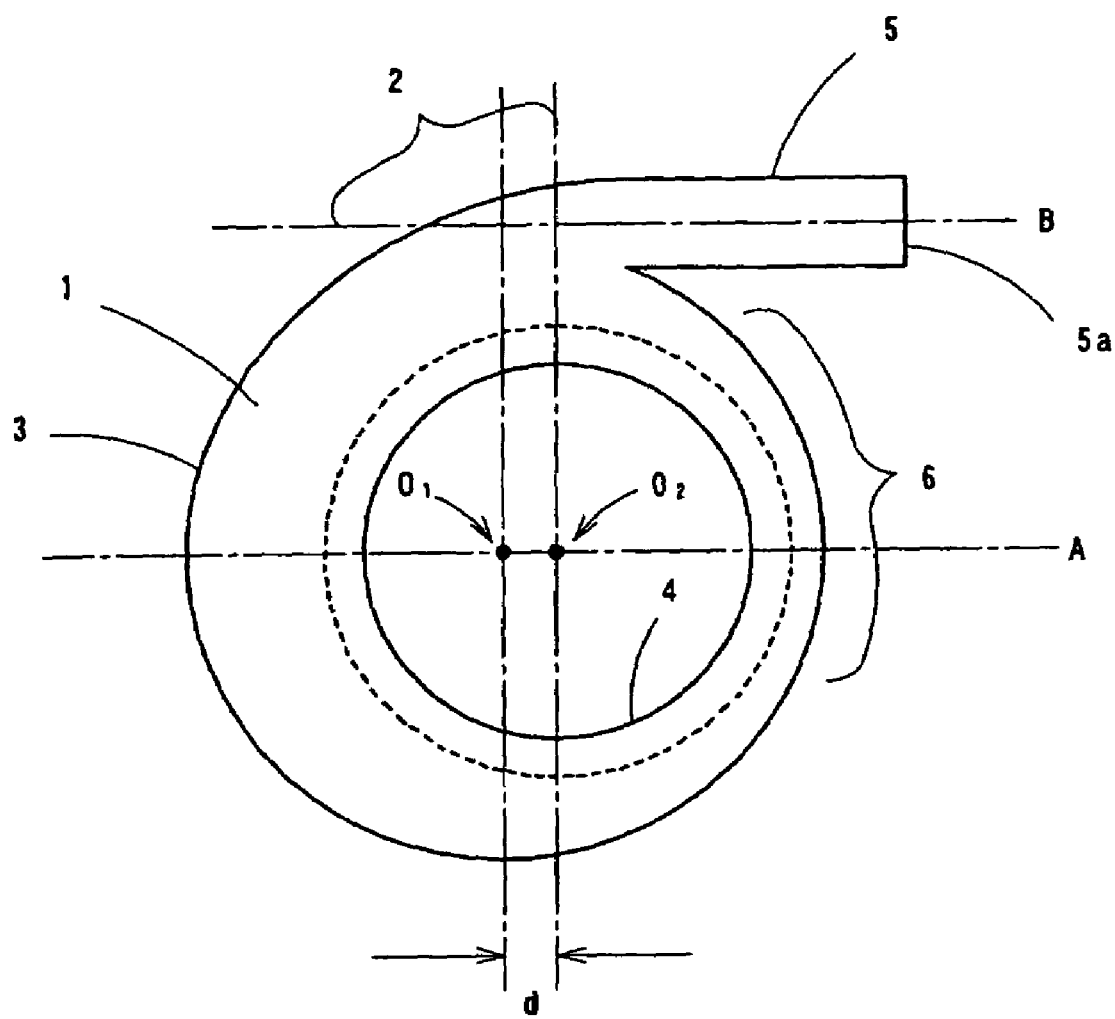
FIG. 1 is a plan view showing examples of ring-shaped light guiding member and a light guiding path that are used in the invention.

Hereinafter, referring to FIG. 1, the configuration of a ring-shaped light guiding member will be described. Note that FIG. 1 is a plan view which explains the general concept of a ring-shaped light guiding member that is used in the invention.

A ring-shaped light guiding member 1 has an outer circumference 3 which is truly round except for a light inlet portion 2 (a portion connected to a light guiding path 5) when viewed from the top. In addition, an inner circumference 4 thereof is similarly truly round when viewed from the top. In the ring-shaped light guiding member 1, a center $O_2$ of the truly round inner circumference 4 is located closer to an open end 5a of the light guiding path 5 than a center $O_1$ of the truly round outer circumference 3. In other words, the center $O_2$ of the truly round inner circumference 4 is not superposed on the center $O_1$ of the truly round outer circumference 3 and is offset (decentered) towards the open end 5a of the light guiding path 5, whereby an area 6 which is close to the open end 5a of the light guiding path 5 in the ring-shaped light guiding member (the relevant area resides farther away from the light inlet portion 2 as viewed in a light traveling direction of light taken in from the light inlet portion 2) is thinned (the width is narrowed). In FIG. 1, the truly round outer circumference 3 and the truly round inner circumference 4 of the ring-shaped light guiding member 1 are displaced from each other in such a manner that an imaginary straight line A which connects the center $O_1$ of the outer circumference 3 with the center $O_2$ of the inner circumference 4 becomes parallel to a center axis B of the light guiding path 5. In other words, the center $O_2$ of the inner circumference 4 is displaced along the center axis B of the light guiding path 5 (in parallel) in a rightward direction as viewed in FIG. 1 from the center $O_1$ of the outer circumference 3 when the latter is regarded as constituting a reference position. In the event that the ring-shaped light guiding member is designed such that the center $O_2$ of the inner circumference 4 is so disposed, a portion of the ring-shaped light guiding member 1 which is in the vicinity of the light inlet portion 2 is not thinned (the width is not narrowed). Consequently, there is no case where the light guiding effect is reduced in the vicinity of the light inlet portion 2. In addition, since the light density is increased, an increase in emission luminance in the vicinity of the light inlet portion 2 can also be prevented.

A distance d between the center $O_1$ of the outer circumference 3 and the center $O_2$ of the inner circumference 4 of the ring-shaped light guiding member 1 (a displacement of the centers) is, for example, 2% to 10% and preferably 3% to 5% per 100% of an diameter of the inner circumference 4, and when expressed based on a diameter of the outer circumference 3, the distance d is, for example, 0.5% to 8% and preferably 2% to 4% per 100% of the diameter of the outer circumference 3. It is particularly preferable that the displacement of the centers falls in both the ranges expressed based on the diameter of the inner circumference and the ranges expressed based on the diameter of the outer circumference. Note that in case the displacement of the centers is too large, part of the ring-shaped light guiding member is extremely thinned, and the light density becomes too high thereat and hence the light guiding effect is affected, whereby the luminance balance in the entirety of the ring-shaped light guiding member is damaged. On the other hand, in case the displacement of the centers is too small, the advantage of the invention is not sufficiently exhibited that the luminance is made even by thinning part of the ring-shaped light guiding member.

The displacement of the centers is such as to be set so that a ring-shaped light having less luminance unevenness is produced over the entirety of the ring-shaped light guiding member. In other words, the displacement of the centers can be adjusted minutely while observing the luminance balance over the entirety of light emission.

A light emitting surface is formed on the ring-shaped light guiding member in such a manner as to extend continuously along a direction in which the ring-shaped light guiding member extends. For example, in the event that a reflecting treatment is provided on an area along the inner circumference on a lower surface of the ring-shaped light guiding member, light is reflected by the relevant area, whereby light is taken out from an upper surface portion of the ring-shaped light guiding member which is located above the reflecting treatment applied area. Thus, part of the upper surface of the ring-shaped light guiding member can be made into a light emitting surface.

There is no specific limitation on the cross-sectional shape of the ring-shaped light guiding member. There can be raised, as examples of cross-sectional shapes thereof, shapes of circle, oval, rectangle, triangle and other polygons and a U-like shape.

A half mirror layer can be formed on a light emitting surface of the ring-shaped light guiding member. By adopting this configuration, a light emitting surface portion is observed in a metallic cooler by virtue of a half mirror effect when the external illuminance is high such as during day time, whereby a specific design quality and a high product quality can be obtained. In addition, unexpectedness can be created by difference in appearance design between day time and night time.

The half mirror layer can be formed of, for example, a predetermined thickness of a metallic layer (Al, Ag, Au and the like). In addition, the half mirror layer can also be formed by sequentially laminating the metallic layer like this and a protection layer formed from a light transmitting resin. To show one example of half mirror layer forming methods, a metallic layer made up of an Al film is formed by depositing Al on the surface of the light emitting surface. The metallic layer is thickened to obtain the half mirror effect. For example, the metallic layer is formed into a thickness that provides a light transmittance of about 15 to 20%. Following this, a transparent resin such as an epoxy resin is superposed on the metallic layer through printing, coating and the like so as to form a protection layer. The configuration and method of forming the half mirror layer are, of course, not limited to what has been described above, and other related configurations and methods can be adopted. In addition, an ink layer can be provided on the surface of the protection layer or between the metallic layer and the protection layer. The ink layer can be formed by printing and coating, for example, a yellow ink.

A layer containing a fluorescent material can be formed on the light emitting surface of the ring-shaped light guide part. By adopting this configuration, the wavelength of part of light emitted from an LED light source can be transformed to transform the color of light emitted from the light emitting surface. A layer containing such a fluorescent material can be formed by printing and coating an ink or paint which contains the fluorescent material or affixing a sheet containing the fluorescent material. Note that the fluorescent material can also be contained in the protection layer and the ink layer which make up the half mirror layer.

The fluorescent material can also be contained in the ring-shaped light guiding member. In this configuration, a fluorescent light is produced within the ring-shaped light guiding member. In consideration of light emitting forms, an organic or inorganic fluorescent material can be used. When an organic fluorescent material is used, a light emitting form can be obtained which provides a sense of clearness. On the other hand, when an inorganic fluorescent material is used, a light emitting form can be obtained which provides a matt appearance.

The ring-shaped light guiding member can be fabricated by, for example, molding or the like in such a manner that a light transmitting material is molded into a desired shape. As light transmitting materials, it is possible to use inorganic materials such as synthetic resins including polycarbonate, acrylic resin, epoxy resin, urethane resin and the like, and glass. The ring-shaped light guiding member may be made up of two or more kings of material. For example, a double-layer structure may be adopted which is made up of a tubular cladding and a core that is formed of a material having a higher refractive index than a material forming the tubular cladding.

(Light Guiding Path)

The light guiding path is continuously connected to part of the outer circumference of the ring-shaped light guiding member. It is preferable to adopt a light guiding path whose center axis becomes parallel to or is superposed on a center axis of the ring-shaped light guiding member in the vicinity of the light inlet portion of the ring-shaped light guiding member. According to the light guiding path that is configured as has just been described, light of the light source can be introduced with good efficiency directly or by making use of reflection on the outer circumference of the light guiding path in the direction in which the ring-shaped light guiding member extends. Consequently, a high light utilization rate and a good light guiding effect can be obtained.

It is preferable that the light guiding path is connected to the ring-shaped light guiding member in such a manner that the center axis of the light guiding path becomes parallel to the upper surface and the lower surface of the ring-shaped light guiding member. This is because it becomes possible to prevent effectively light that is introduced into the ring-shaped light guiding member through the light guiding path from being directed directly toward the upper surface of the lower surface of the ring-shaped light guiding member at the light inlet portion or in the vicinity of the light inlet portion, whereby a good light guiding effect can be exhibited. In particular, according to this configuration, it becomes possible to prevent the light inlet portion or the vicinity thereof from being illuminated with high luminance compared with the other areas of the ring-shaped light guiding member. On the other hand, the light guiding path can also be connected to the ring-shaped light guiding member in such a manner that the center axis of the light guiding path intersects with the upper surface and the lower surface of the ring-shaped light guiding member at an acute angle. In this configuration, the introduced light becomes easy to be reflected totally by the upper surface or the lower surface of the ring-shaped light guiding member, thereby making it possible to obtain a good light guiding effect. Here, the acute angle means an angle of, for example, not more than about 65°, preferably not more than about 45°, further preferably not more than about 30°, and much further preferably about 20°. To be specific, the acute angle can be set in the range, for example, from about 5% to about 65°, from about 10° to about 45°, from about 10° to about 30°, and from about 15° to 20°. Note that since the total reflection angle differs depending upon materials, the material of the ring-shaped light guiding member can be taken into consideration in setting the angle of the intersection of the center axis of the light guiding path with the ring-shaped light guiding member.

In addition to the above feature, when looking at the ring-shaped light guiding member from the top, the light guiding path is preferably connected to the ring-shaped light guiding member in such a manner that the center axis of the light guiding path becomes parallel to or is superposed on the center axis of the ring-shaped light guiding member. According to this configuration, a light introduction via the light guiding path can be made possible in which an introduced light efficiently travels in the direction of the center axis of the light guiding path, that is, in the direction in which the ring-shaped light guiding member extends, whereby a good light guiding effect can be obtained, and the evening of luminance can be promoted. In addition, the utilization of light can also be increased.

The light guiding path is preferably connected to the ring-shaped light guiding member so that light from the light source can be introduced into the ring-shaped light guiding member with the loss of as little light as possible. For example, as will be described in detail below, constructing the light guiding path integrally with the ring-shaped light guiding member can serve to attain a higher light introduction rate.

Note that provided that a high light introduction rate can be secured, the light guiding path may be connected to the ring-shaped light guiding member using an adhesive. In addition, the light guiding path can be connected to the ring-shaped light guiding member with other means such as welding and fusing.

Light of the light source is introduced into the light guiding path. For example, a light introducing surface is formed at an end where the light guiding path is connected to the ring-shaped light guiding member and an opposite end portion thereof. In this configuration, a light source, which will be described later on, is placed in such a manner as to face the light introducing surfaces. A plurality of light introducing surfaces may be provided depending according to the number of light sources.

On the other hand, the light source may be incorporated in the light guiding path. Namely, the light guiding path and the light source may be constructed integrally with each other. For example, assuming that the light guiding path is molded from a light guiding resin, an LED is in-molded, whereby the aforesaid structure can be realized.

The introduction of light into the light guiding path is implemented directly from the light source or indirectly via the reflecting surface. However, the former method is preferable because the former only needs a simple structure and provides less a risk that light is lost on the reflecting surface or the like.

Any material can be used for the light guiding path, provided that light from the light source is well guided therethrough. The light guiding path is preferably made from a light guiding material. The light guiding path is further preferably made from a material having the same refractive index as that of the material which constitutes the ring-shaped light guiding member. By adopting this configuration, there can be eliminated a risk that light is reflected or refracted at a connecting portion between the light guiding path and the ring-shaped light guiding member. In addition, in the event that the light guiding path is made from the same material as that constituting the ring-shaped light guiding member, these members can be prepared as being constructed integrally by means of injection molding. Consequently, the light guiding path and the ring-shaped light guiding member are connected to continue in a complete fashion, and hence an extremely high light introduction efficiency can be obtained. In addition, this provides advantages with respect to production processes and production costs.

The light guiding path may be formed into a cylindrical shape, triangular prism, quadrangular prism and other polygonal prisms. A light guiding path can be adopted which is inconsistent in cross-sectional shape and/or cross-sectional area.

In the event that there is anticipated a leakage of light via the outer circumference of the light guiding path that is attributed to the nature of a constituent material, the anticipated light leakage is preferably prevented by forming a reflecting layer on the outer circumference of the light guiding path.

Such a reflecting layer can be formed on the outer circumference of the light passing path by printing, depositing or spattering a light reflecting ink (for example, an ink of the white system) on the outer circumference of the light guiding path. In addition, the reflecting layer can be formed by affixing a tape of the white system. A light reflecting ink and a white system tape which have a high index of refraction are preferably used. Alternatively, the reflecting surface can also be formed by roughening the surface of the outer circumference of the light guiding path through a surface treatment by etching, sandblasting or electric discharging. Furthermore, the reflecting surface can be formed by closely disposing a member whose surface is highly reflective (for example, a white resin, a resin whose surface is plated with Ag, Al and the like) on the outer circumference of the light guiding path.

(Light Source)

There is no specific limitation on the light source, and hence LEDs, bulbs or the like can be used. Among them, LEDs are preferable. This is because since LEDs are small in size, they serve to make devices smaller in size. In addition, LEDs have a small heat release value and hence are advantageous in that peripheral members (the light guiding path and an object to be decorated) are less affected by heat generated therefrom. Furthermore, LEDs are also advantageous in that they only need a small drive power and have a long service life. There is no specific limitation on types of LEDs, and hence various types of LEDs can be used which includes round or chip types of LEDs.

Colors can arbitrarily be selected for the light source. It is possible to alter the color of light to be emitted by controlling a plurality of light sources that are used. For example, an LED is used in which light emitting elements which emit red, green and blue lights are mounted on a single substrate, and light emitting modes of the respective light emitting elements are controlled so that lights in desired colors can be emitted, whereby a light emitting unit can be configured which emits lights in desired colors.

In order to efficiently introduce light from the light source into the light guiding path, the light source is preferably disposed near or closed to the light introducing surface of the light guiding path. Alternatively, the light source is preferably disposed within the light guiding path. A plurality of light sources may be used for a single light guiding path. An increase in the luminance of light to be emitted can be realized by using the plurality of light sources.

(Embodiment)

Figure 2:
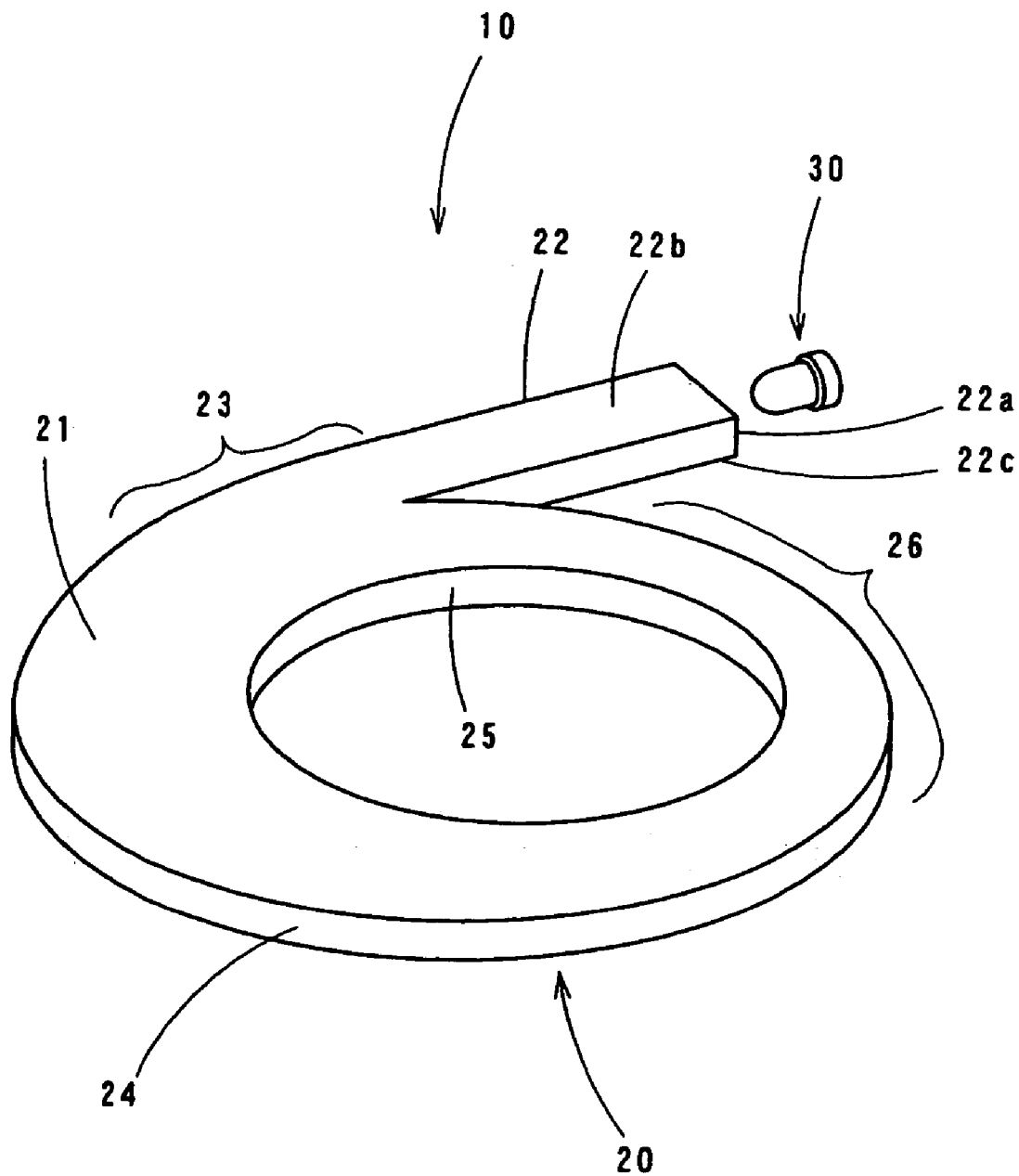
FIG. 2 is a perspective view showing a ring-shaped light emitting unit that is an embodiment of the invention.
Figure 3:
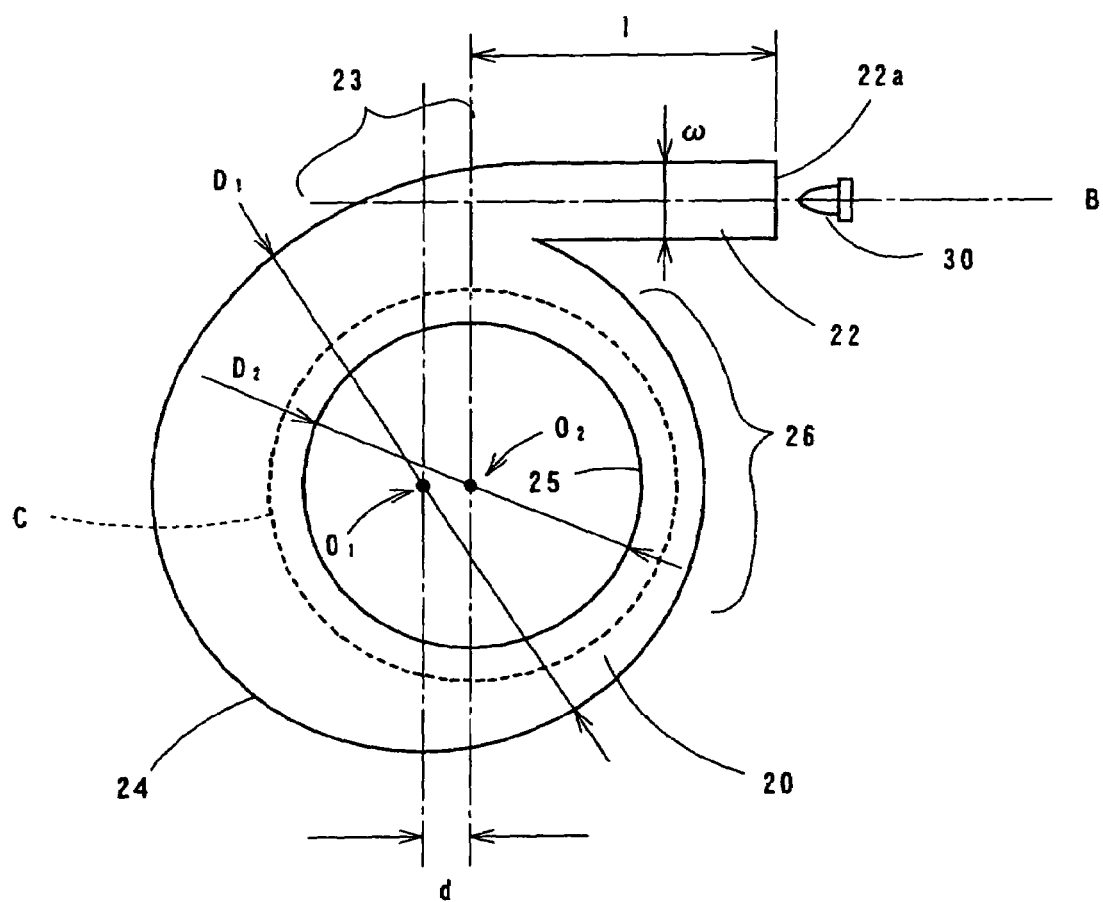
FIG. 3 is a plan view of the ring-shaped light emitting unit.
Figure 4:
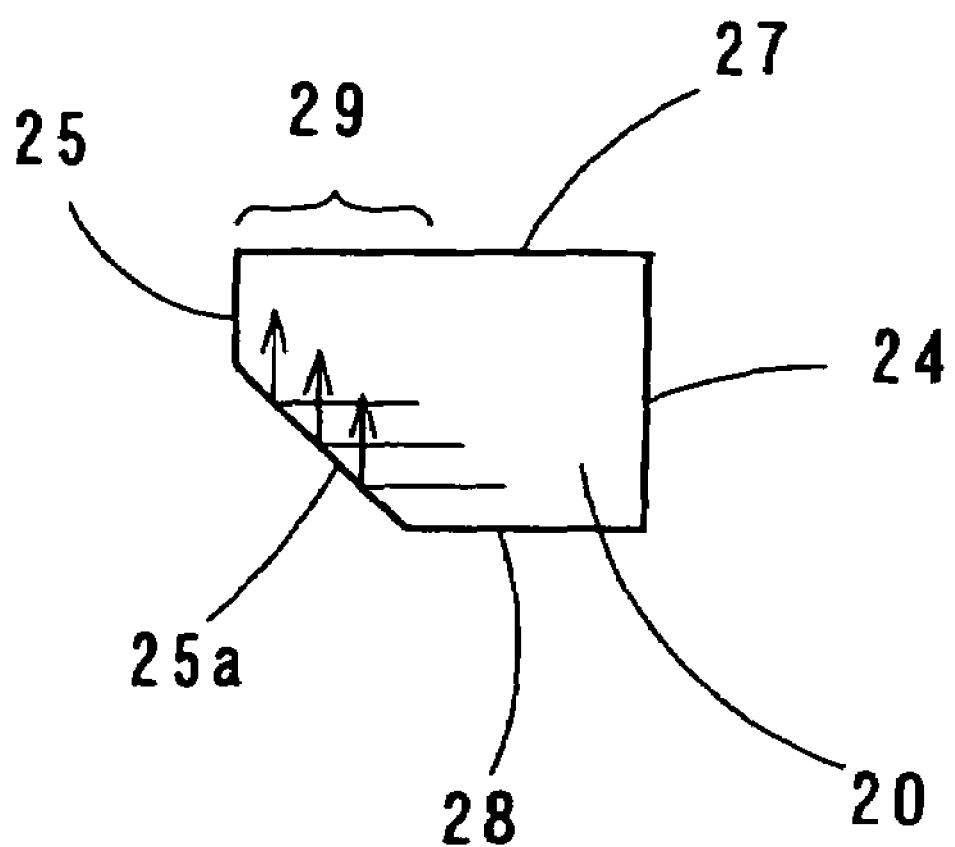
FIG. 4 is a cross-sectional view of the ring-shaped light guiding member 21 making up the ring-shaped light emitting unit 10.

A ring-shaped light emitting unit according to an embodiment of the invention is shown in FIGS. 2 to 4. FIG. 2 is a perspective view of a ring-shaped light emitting unit 10, FIG. 3 is a plan view of the same, and FIG. 4 is a cross-sectional view in a perpendicular direction of a light emitting portion 20 (a ring-shaped light guiding member) of the ring-shaped light emitting unit 10. The ring-shaped light emitting unit 10 of this embodiment is used, for example, to decorate the perimeter of a speaker grill. Hereinafter, referring to the respective drawings, the configuration and light emitting form of the ring-shaped light emitting unit 10 will be described.

Figure 5:
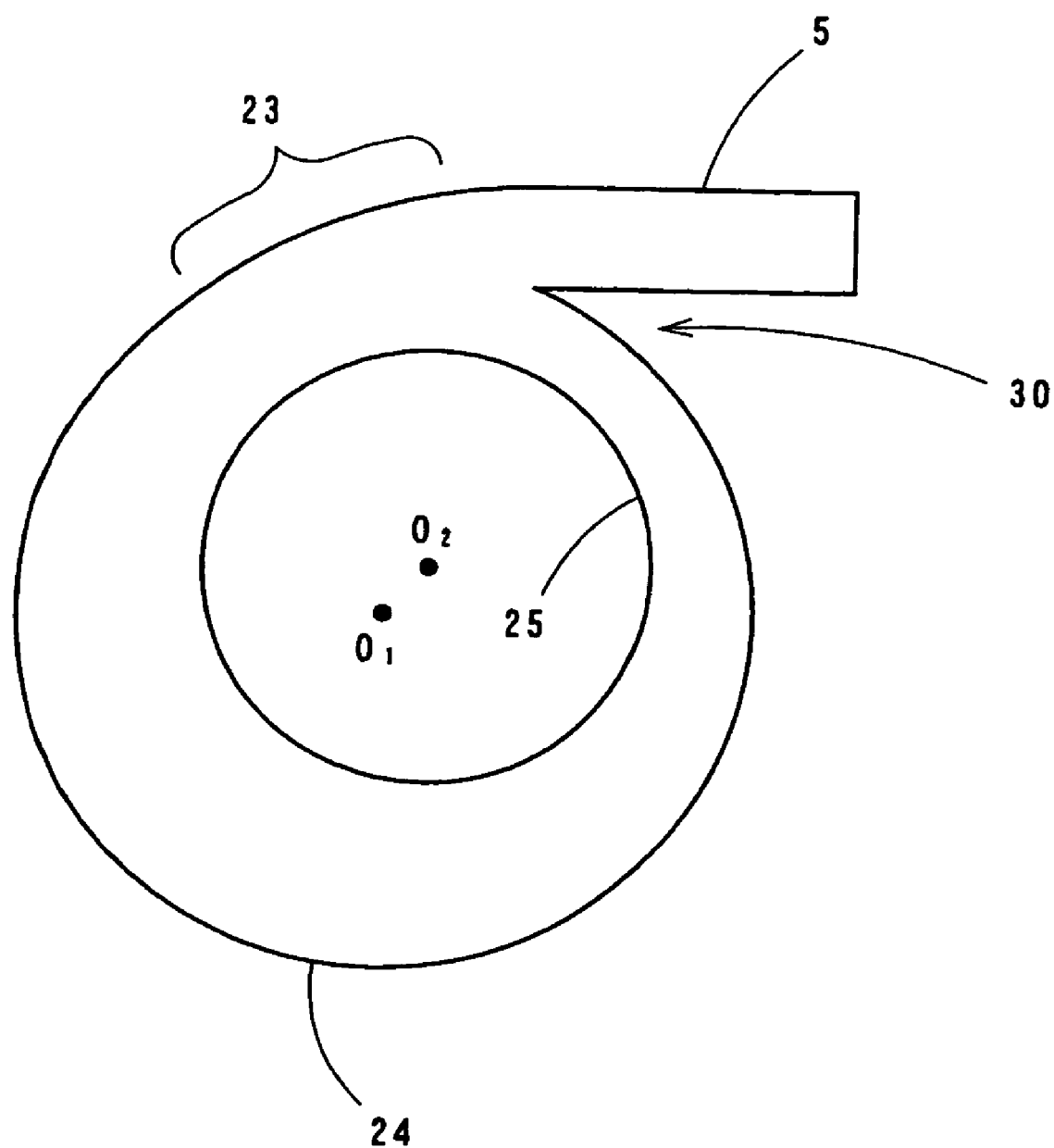
FIG. 5 is a plan view showing a ring-shaped light guiding member of a comparison example.

The ring-shaped light emitting unit 10 is generally made up of the light emitting portion 20 and a light source 30. The light emitting portion 20 includes a ring-shaped light guiding part 21 and a light guiding path 22 which continues to part of an outer circumference 24 of the ring-shaped light guiding member 21. The ring-shaped light guiding-member 21 is formed substantially into a doughnut shape in which the outer circumference 24 and an inner circumference 25 are both truly round except for a light inlet portion 23 when viewed from the top. As shown in FIG. 3, however, a center $O_1$ of the outer circumference 24 and a center $O_2$ of the inner circumference 25 of the ring-shaped light guiding member 21 do not coincide with each other, whereby part 26 of the ring-shaped light guiding member 21 is thinned (the width is narrowed). In this embodiment, the center $O_2$ of the inner circumference 25 is offset or displaced in a rightward direction as viewed in the figure along a center axis B of the light guiding path 22. The displacement of the center $O_2$ of the inner circumference 25 in that direction, that is a distance between the center $O_1$ of the outer circumference 24 and the center $O_2$ of the inner circumference 25 of the ring-shaped light guiding member 21 is about 1 mm, which corresponds to about 2% of a diameter $D_1$ (about 47 mm) of the outer circumference 24 and about 3% of a diameter $D_2$ (about 29 mm) of the inner circumference 25. In the event that the ring-shaped light guiding member 21 is designed like this, the vicinity of the light inlet portion 23 of the ring-shaped light guiding member 21 is not thinned. In contrast to this, for example, as shown in FIG. 5, in the event that the ring-shaped light guiding 21 is designed such that the center 02 of the inner circumference 25 of the ring-shaped light guiding member 21 is offset or displaced towards an area 30 which is farthest away from the light inlet portion 23 in a direction in which the guided light travels, the vicinity of the light inlet portion 23 is thinned. In conjunction with this, the light guiding effect in the vicinity of the light inlet portion 23 is reduced, and at the same time, the light density in the vicinity of the light inlet portion 23 is increased, leading to luminance irregularities. With the configuration of the ring-shaped light guiding member 21 of the invention, there is caused no risk that the luminance irregularities are generated for this reason.

Both an upper surface 27 and a lower surface 28 of the ring-shaped light guiding member 21 are flat planes (FIG. 4). On the other hand, an inclined surface 25a of an angle of about 45° is formed on an inner circumference 25 side of the ring-shaped light guiding member 21 (FIG. 4). An embossing treatment is applied to the inclined surface 25a, whereby light reflecting and light diffusing qualities are imparted to the inclined surface 25a.

The light guiding path 22 is formed into a prism with a quadrangular shape and is made up of a rectilinear portion and a curved portion. The light guiding path 22 of the embodiment is about 30 mm in length l and about 7 mm in width w. The light guiding path 22 is connected to the outer circumference 24 of the ring-shaped light guiding member 21 at one end thereof. In this embodiment, the light guiding path 22 is formed integrally with the ring-shaped light guiding member 21 (that is, with no connecting line provided). The light guiding path 22 is connected to the ring-shaped light guiding member in such a manner that the center axis B of the rectilinear portion becomes substantially parallel to a center axis C of a portion of the ring-shaped light guiding member 21 which is in the vicinity of the light inlet portion 23. Note that an upper surface 22b and a lower surface 22c of the light guiding path 22 are flush with the upper surface 27 and the lower surface 28 of the ring-shaped light guiding member 21, respectively.

In this embodiment, the light emitting portion 20 (the ring-shaped light guiding member 21 and the light guiding path 22) are made from acrylic resin. The light emitting portion 20 that is so made can be fabricated by a molding process (for example, an injection molding process) in which a mold is used which corresponds to the shape of the light emitting portion 20.

A light source 30 is provided at a position which faces an open end 22a of the light guiding path 22. In this embodiment, a bullet type LED which emits a blue light is used as the light source 30.

Next, a light emitting mode of a ring-shaped light emitting device 1 will be described. Firstly, light emitted from the LED 30 is incident on the open end 22a of the light guiding path 22, whereby the light so taken in the light guiding path 22 is guided through the interior of the light guiding path 20 to be directed towards the ring-shaped light guiding member 21. Then, the light passes through the connecting portion (the light inlet portion 23) between the light guiding path 22 and the ring-shaped light guiding member 21 so as to travel into the ring-shaped light guiding member 21. The light which is taken into the ring-shaped light guiding member 21 is guided through the interior of the ring-shaped light guiding member 21, and part of the light so guided is reflected on the inclined surface 25a (the reflecting surface) on the inner circumference 25 side of the ring-shaped light guiding member 21 to thereby constitute a light that is directed upwards, which is finally emitted to the outside from part of the upper surface 27 of the ring-shaped light guiding member 21. As a result, a certain area (a light emitting area 29) on the upper surface 27 of the ring-shaped light guiding member 21 on the inner circumference thereof is illuminated, thereby a ring-shaped light being obtained.

Here, as has been described above, the outer circumferential shape of the ring-shaped light guiding member 21 except for the light inlet portion 23 is truly round. Namely, the curvature of the outer circumference 24 of the ring-shaped light guiding member 21 is constant except for the light inlet portion 23. Thus, since the curvature is constant, an even reflecting effect can be obtained on the outer circumferential surface, whereby the generation of an emission line can be prevented. On the other hand, the center $O_2$ of the inner circumference 25 of the ring-shaped light guiding member 21 is displaced from the center $O_1$ of the outer circumference 24 thereof, whereby the farthest area 26 of the ring-shaped light guiding member 21 from the light inlet portion 23 is thinned. Since the relevant area 26 resides far away from the light inlet portion 23, the total amount of light that reaches the area is reduced. However, since the area is formed thin, the light density thereat is increased, whereby the amount of light that reaches the light reflecting surface 25a of the relevant area 26 is increased, so that the insufficient light amount is compensated for. As a result, the amount of light emission at the relevant area 26 is increased, and a difference in light emission amount between the other areas of the ring-shaped light guiding member 21 and itself is alleviated, the luminance is evened over the entirety of the ring-shaped light guiding member. Thus, according to the embodiment, a ring-shaped light can be produced whose luminance is highly evened.

On the other hand, since the light guiding path 22 is configured such that the center axis C of the portion of the ring-shaped light guiding member 21 which is in the vicinity of the light inlet portion 23 becomes parallel to the center axis B of the light guiding path 22, the light introduced into the ring-shaped light guiding member 21 through the light guiding path 22 is allowed efficiently to travel in the direction in which the ring-shaped light guiding member 21 extends. In other words, a good light guiding effect can be exhibited, whereby not only can an even luminance be realized but also the utilization rate of light can be increased, thereby making it possible to obtain a ring-shaped light with a high luminance.

Figure 6A:
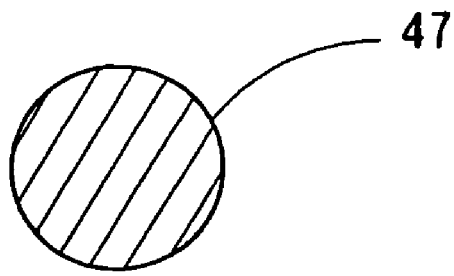
FIGS. 6A, 6B, 6C show examples of cross-sectional shapes of the ring-shaped light guiding member and the light guiding path that are used in the invention.
Figure 6B:
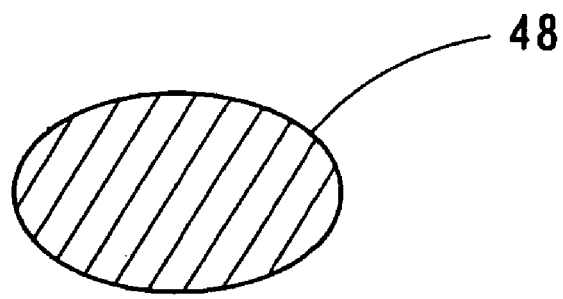
Figure 6C:
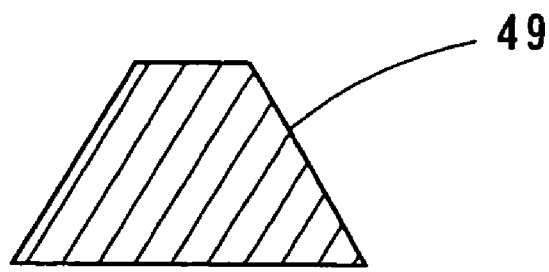
Figure 7:
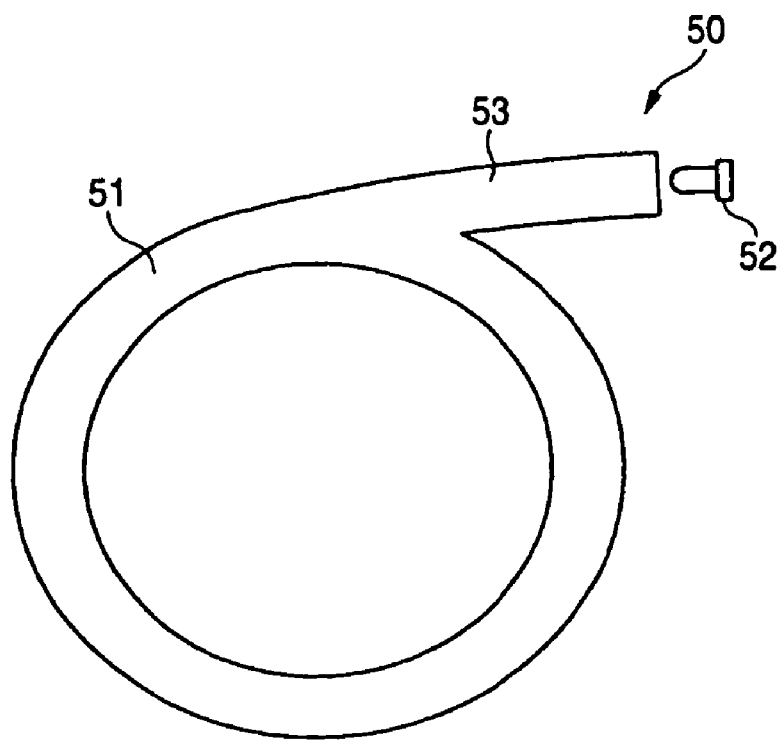
FIG. 7 is a drawing showing a related ring-shaped light emitting unit.
Figure 8A:
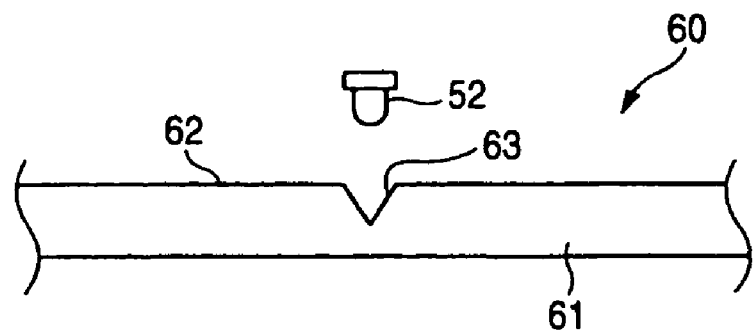
FIGS. 8A and 8B are drawings showing other related ring-shaped light emitting units.
Figure 8B:
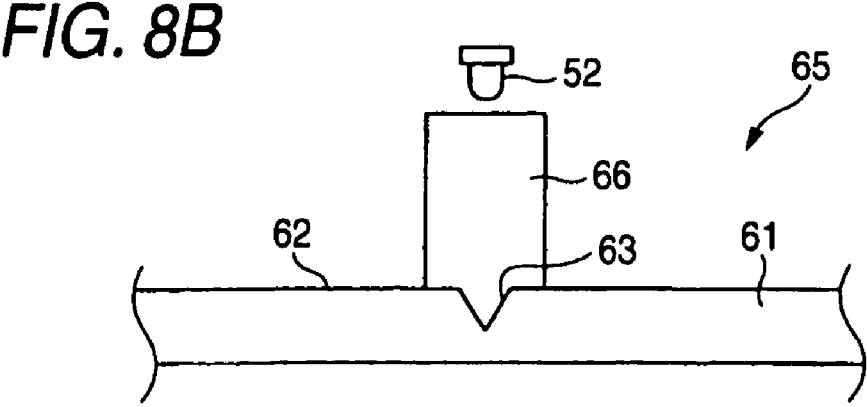

In this embodiment, while the ring-shaped light guiding member and the light guiding path which both have the quadrangular cross section are adopted, the cross-sectional shape of the ring-shaped light guiding member and the light guiding path are not limited thereto. Other examples of cross-sectional shapes of the ring-shaped light guiding member and the light guiding path are shown in FIG. 6. As is shown therein, various cross-sectional shaped (47 to 49) can be adopted which include circle (FIG. 6A), oval (FIG. 6B), trapezoid (FIG. 6C) and the like. Note that the cross-sectional shape of the ring-shaped light guiding member and that of the light guiding path may be difference from each other.

According to the invention, the ring-shaped emitted light can be obtained in which the luminance is evened. The light which has the superior decorating characteristic like this can be used to increase the design quality of various objects. To be specific, The invention can be applied to decorate speaker grilles or watches or speedometers or tachometers of vehicles (automobiles, trains) or aircraft.

The invention is not limited to the mode for carrying out the invention and the embodiment thereof at all. The invention includes various forms which those skilled in the art can easily attain without departing from claims of the invention described herein.

What is claimed is:

1. A ring-shaped light emitting unit, comprising:
   a ring-shaped light guiding member comprising a light emitting surface which continues in a direction in which the ring-shaped light guiding member extends; and
   a light guiding path for introducing light of a light source into the ring-shaped light guiding member connected to part of an outer circumference of the ring-shaped light guiding member,
   wherein the outer circumference, excluding a light inlet portion, of the ring-shaped light guiding member and an inner circumference of the ring-shaped light guiding member are truly round when viewed from a top of the ring-shaped light guiding member, and
   wherein a center of the inner circumference of the ring-shaped light guiding member is located closer to an open end of the light guiding path than a center of the outer circumference of the ring-shaped light guiding member.

2. A ring-shaped light emitting unit, comprising:
   a ring-shaped light guiding member comprising a light emitting surface which continues in a direction in which the ring-shaped light guiding member extends; and
   a light guiding path for introducing light of a light source into the ring-shaped light guiding member connected to part of an outer circumference of the ring-shaped light guiding member,
   wherein the outer circumference, excluding a light inlet portion, of the ring-shaped light guiding member and an inner circumference of the ring-shaped light guiding member are truly round when viewed from a top of the ring-shaped light guiding member,
   wherein a center of the inner circumference of the ring-shaped light guiding member is located closer to an open end of the light guiding path than a center of the outer circumference of the ring-shaped light guiding member, and
   wherein a distance between the center of the outer circumference of the ring-shaped light guiding member and the center of the inner circumference thereof is 2% to 10% per 100% of a diameter of the inner circumference thereof.

3. A ring-shaped light emitting unit, comprising:
   a ring-shaped light guiding member comprising a light emitting surface which continues in a direction in which the ring-shaped light guiding member extends; and
   a light guiding path for introducing light of a light source into the ring-shaped light guiding member connected to part of an outer circumference of the ring-shaped light guiding member,
   wherein the outer circumference, excluding a light inlet portion, of the ring-shaped light guiding member and an inner circumference of the ring-shaped light guiding member are truly round when viewed from a top of the ring-shaped light guiding member,
   wherein a center of the inner circumference of the ring-shaped light guiding member is located closer to an open end of the light guiding path than a center of the outer circumference of the ring-shaped light guiding member, and
   wherein a distance between the center of the outer circumference of the ring-shaped light guiding member and the center of the inner circumference thereof is 0.5% to 8% per 100% of a diameter of the outer circumference thereof.

4. The ring-shaped light emitting unit according to claim 1, wherein a center axis of the light guiding path is in parallel with a-center axis of the ring-shaped light guiding member in a vicinity of the light inlet portion.

5. The ring-shaped light emitting device according to claim 1, wherein a center axis of the light guiding path is superposed on a center axis of the ring-shaped light guiding member in a vicinity of the light inlet portion.

6. The ring-shaped light emitting unit according to claim 1, wherein an imaginary straight line which connects the center of the outer circumference of the ring-shaped light guiding member with the center of the inner circumference thereof is substantially parallel with a center axis of the light guiding path.

7. The ring-shaped light emitting unit according to claim 1, wherein the light guiding path comprises a light guiding member which comprises a same material as that of the ring-shaped light guiding member.

8. The ring-shaped light emitting unit according to claim 1, wherein the ring-shaped light guiding member and the light guiding path are formed integrally with each other.

9. The ring-shaped light emitting unit according to claim 1, wherein the light source comprises an LED.

10. The ring-shaped light emitting unit according to claim 1, wherein the ring-shaped light guiding path is continuously connected to a part of the ring-shaped light guiding member.

11. The ring-shaped light emitting unit according to claim 1, wherein the light inlet portion connects the ring-shaped light guiding member and the light guiding path.

12. A ring-shaped light emitting unit, comprising:
    a ring-shaped light guiding member comprising a light emitting surface which continues in a direction in which the ring-shaped light guiding member extends; and
    a light guiding path for introducing light of a light source into the ring-shaped light guiding member connected to part of an outer circumference of the ring-shaped light guiding member,
    wherein the outer circumference, excluding a light inlet portion, of the ring-shaped light guiding member and an inner circumference of the ring-shaped light guiding member are truly round when viewed from a top of the ring-shaped light guiding member,
    wherein a center of the inner circumference of the ring-shaped light guiding member is located closer to an open end of the light guiding path than a center of the outer circumference of the ring-shaped light guiding member, and
    wherein an inclined surface is formed on an inner surface side of the ring-shaped light guiding member.

13. The ring-shaped light emitting unit according to claim 12, wherein the inclined surface comprises a reflection surface for reflecting an introduced light.

14. The ring-shaped light emitting device according to claim 1, wherein said ring-shaped light guiding member comprises:
    an open end portion, which is disposed adjacent to an open end of said light guiding path, having a width that is more narrow than a width of a remaining portion of said ring-shaped light guiding member.

15. The ring-shaped light emitting device according to claim 1, wherein a distance between the center of the outer circumference of the ring-shaped light guiding member and the center of the inner circumference of the light guiding member is 3% to 5% per 100% of a diameter of the inner circumference of the ring-shaped light guiding member.

16. The ring-shaped light emitting device according to claim 1, wherein a distance between the center of the outer circumference of the ring-shaped light guiding member and the center of the inner circumference of the ring-shaped light guiding member is 2% to 4% per 100% of a diameter of the outer circumference of the ring-shaped light guiding member.

17. The ring-shaped light emitting device according to claim 1, further comprising:
a half mirror layer formed on the light emitting surface of the ring-shaped light guiding member.

18. The ring-shaped light emitting device according to claim 1, further comprising:
a layer containing a fluorescent material formed on the light emitting surface of the ring-shaped light guiding member.

19. The light emitting unit according to claim 1, wherein the center of the inner circumference of the ring-shaped light guiding member is offset towards an open end of the ring-shaped light guiding member.

* * * * *